Oct. 26, 1937.  C. B. DAGER  2,096,845
STOP SIGNAL FOR MOTOR VEHICLES
Filed Dec. 5, 1935
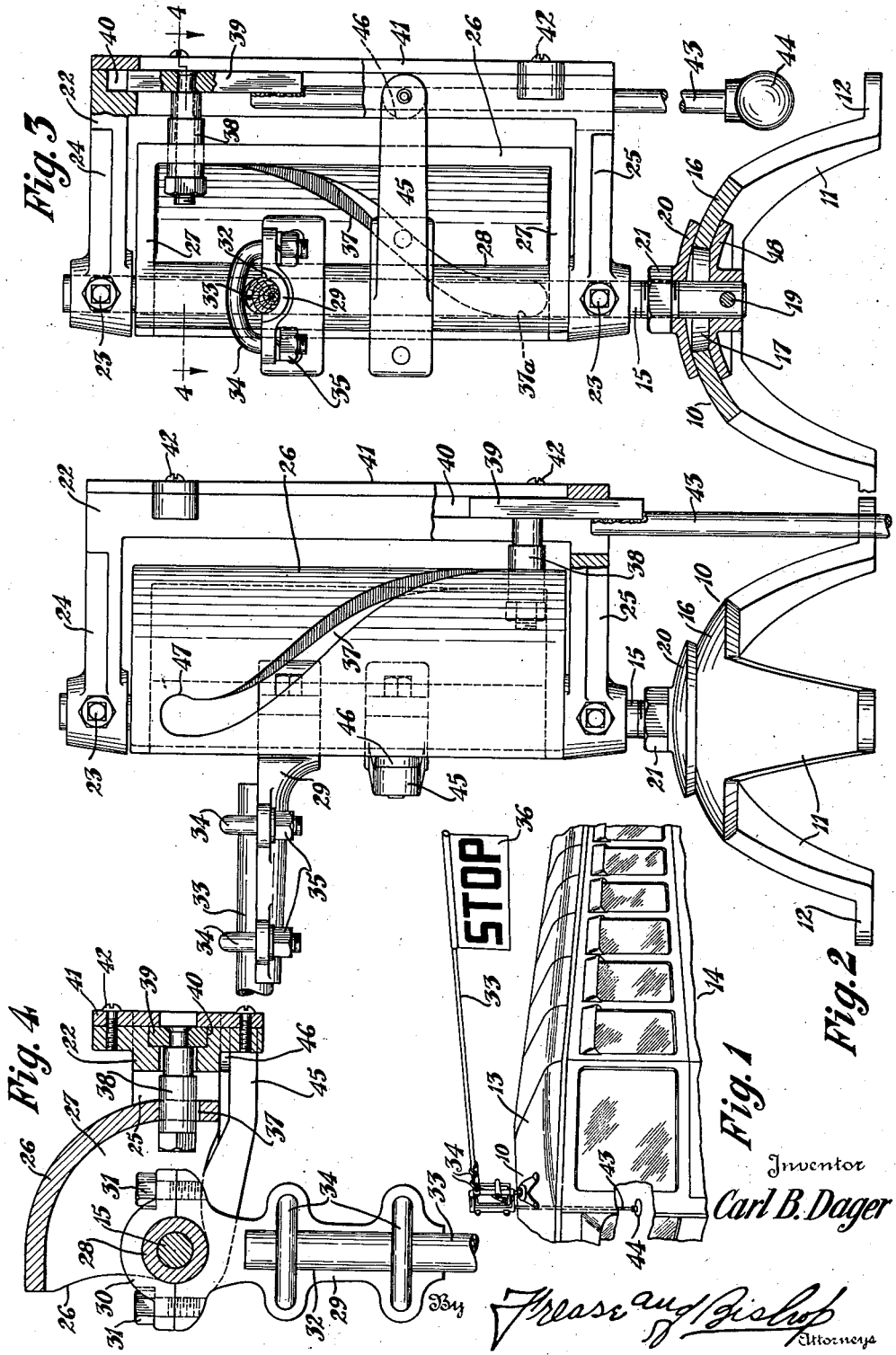
Inventor
Carl B. Dager
By Frease and Bishop
Attorneys Patented Oct. 26, 1937

2,096,845

UNITED STATES PATENT OFFICE 2,096,845

STOP SIGNAL FOR MOTOR VEHICLES

Carl B. Dager, Robertsville, Ohio

Application December 5, 1935, Serial No. 53,039

6 Claims. (Cl. 116—52)

The invention relates to signals for motor vehicles and more particularly to a manually controlled stop signal especially adapted for use upon school busses.

In many States which have adopted the centralized school system in rural districts, laws are in effect commanding the stopping of all traffic in either direction when a school bus stops upon a highway to discharge or pick up children. It frequently happens however that drivers who may be ignorant of the law, or who fail to see the bus driver's signal, pass a school bus standing on the highway, endangering the lives of children getting upon or alighting from the bus.

The object of the present invention is to provide a stop signal, adapted to be operated by the school bus driver, which will instantly command the attention of an approaching motorist, giving him notice to stop.

A further object is to provide a signal of this character which operates in a horizontal plane above the top of the bus, whereby in the event the bus driver neglects to move the signal to the inoperative or off position while driving the bus, the signal will be above the tops of passing vehicles.

Another object is to provide such a signal in which the signal proper is in the form of a light pole of bamboo, or the like, having a fabric flag at its free end, whereby no serious damage will be caused by a truck or other high vehicle colliding therewith.

A still further object is to provide means for holding the signal securely in either position so as to reduce vibration to a minimum.

Another object of the invention is to so construct the signal that the driver may move it to the operative or warning position by a single downward pull upon an operating handle located through the roof of the bus.

Still another object of the invention is to provide a signal of the type referred to with an attaching base adapted to fit upon the top of any bus, adjusting means being incorporated in the base for adjusting the position of the signal to accommodate the same to the top of any bus upon which it is mounted.

The above objects, together with others which will be apparent from the drawing and following description, or which may be later pointed out, may be attained by constructing the improved signal in the manner illustrated in the accompanying drawing, in which Figure 1 is a fragmentary, perspective view of a portion of the body of a bus equipped with the improved signal, which is shown in the operative, or warning, position;

Fig. 2, an enlarged elevation of the signal, shown in the operative position;

Fig. 3, a similar view showing the signal in the inoperative or off position, parts being broken away for the purpose of illustration; and Fig. 4, a transverse sectional view of the signal, taken as on the line 4—4, Fig. 3.

Similar numerals refer to similar parts throughout the drawing.

The improved signal may be carried upon a base indicated generally at 10, having three spaced legs 11, provided with feet 12, adapted to be attached to the roof 13 of a bus, indicated generally at 14, in any usual and well known manner, such as by bolts, screws or the like.

The post 15, which carries the signal operating mechanism, is adjustably mounted upon the base 10, so that it may be adjusted to a vertical position regardless of the position in which the base is mounted upon the top of the bus.

To provide for this adjustment the base includes the semi-spherical portion 16, provided with an enlarged central opening 17, through which the post 15 is located, a similarly curved plate 18 being fixed to the lower end portion of the post as by a pin 19. A washer 20, curved to conform to the curvature of the base, is adapted to be clamped upon the base by the nut 21.

A substantially U-shaped frame 22 is rigidly secured upon the post 15, as by the screws 23 located through the upper and lower legs 24 and 25 respectively of the U-shaped frame.

A semi-cylindric cam member 26 is rotatably mounted upon the post 15, within the U-shaped frame 22, being provided at its upper and lower ends with the segmental webs 27 which are connected to the sleeve 28 journaled upon the post 15.

The signal carrying arm 29 is radially disposed from the tubular sleeve 28, to which it is rigidly connected as by the curved clamp plate 30 and screws 31. This arm has its upper face longitudinally recessed as at 32, to receive the end of a light pole 33 of bamboo or the like, which is clamped upon the arm as by the U-bolts 34 and nuts 35.

This pole is of sufficient length to extend a considerable distance across the road and has a flag 36, of any suitable fabric material connected to its free end, the flag carrying a suitable warning such as the word "STOP".

A curved cam slot 37 is formed in the cylindric cam member 26, and receives a roller or pin 38 carried by the sliding plate or block 39, which is mounted for vertical reciprocation within the guideway 40, formed in the frame 22. A removable cover plate 41 may be mounted over the guideway, being connected to the frame 22 as by the screws 42.

An operating rod 43 is connected to the sliding plate or block 39, and extends down through a suitable opening in the roof of the bus to a point convenient to the driver, and has a knob or handle 44 upon its lower end adapted to be grasped by the driver for pulling the rod downward and pushing it upward to move the signal arm to the warning and off positions.

As best shown in Fig. 3, the curved cam slot 37 terminates at its lower end in a substantially straight portion 37a. When the signal arm is in the warning position the roller 38 will be at the bottom of this straight portion of the slot and will thus hold the parts against movement with the flag pole disposed across the road at right angles to the bus.

When the operating rod is pushed up to the position shown in Fig. 3, the cylindric cam member 26 is given a quarter turn from the position shown in Fig. 2, swinging the flag pole over the top of the bus to a position parallel to the longitudinal axis of the bus, the roller 38 riding to the top of the slot 37.

For the purpose of holding the parts against vibration when in this position, a finger 45 may be clamped upon the sleeve 28 in the same manner as the arm 29, and provided at its free end with a rubber or spring bumper 46 adapted to contact the side of the frame 22 and hold the roller 38 in the recess 47 at the upper end of the cam slot 37.

From the above it will be obvious that a very simple and efficient signal device is provided which is quickly and easily operated, it being necessary only for the driver to pull down upon the operating rod to throw the signal to the warning position, and to push up on the rod to swing the flag pole over the bus and out of the line of vision of approaching drivers.

I claim:

1. In combination with a vehicle, a signal including a horizontal pole of a length suitable to extend substantially across a roadway, signal means upon said pole, means upon the top of the vehicle for supporting said pole spaced above the top of the vehicle, cam means having a cam slot and means controlled from the interior of the vehicle operatively associated with said cam slot for swinging said pole in a horizontal plane from a position which is substantially parallel to the direction in which the vehicle is traveling to a position which is substantially at right angles to the direction in which the vehicle is traveling.

2. In combination with a vehicle, a signal including a horizontal pole of a length suitable to extend substantially across a roadway, signal means upon said pole, means upon the top of the vehicle for supporting said pole spaced above the top of the vehicle, cam means having a cam slot for swinging said pole in a horizontal plane from a position which is substantially parallel to the direction in which the vehicle is traveling to a position which is substantially at right angles to the direction in which the vehicle is traveling, and an operating rod passing through the top of the vehicle and operatively associated with said cam slot for operating said cam means.

3. In combination with a vehicle, a signal including a frame upon the top of the vehicle, a rotary cam member associated with said frame and having a curved cam slot, a horizontal pole carried by said cam member, signal means upon said pole, and an operating rod associated with the cam member and operatively associated with said cam slot for swinging said pole in a horizontal plane from a position which is substantially parallel to the direction in which the vehicle is traveling to a position which is substantially at right angles to the direction in which the vehicle is traveling.

4. In combination with a vehicle, a signal including a frame upon the top of the vehicle, a rotary cam member associated with said frame, a horizontal pole carried by said cam member, signal means upon said pole, said cam member having a cam slot, a roller in said slot, and an operating rod connected to said roller for swinging said pole in a horizontal plane from a position which is substantially parallel to the direction in which the vehicle is traveling to a position which is substantially at right angles to the direction in which the vehicle is traveling.

5. In combination with a vehicle, a signal including a frame upon the top of the vehicle, a rotary cam member associated with said frame, a horizontal pole carried by said cam member, signal means upon said pole, said cam member having a curved cam slot, a reciprocating operating rod, a roller carried by said rod and engaging said cam slot for swinging said pole in a horizontal plane from a position which is substantially parallel to the direction in which the vehicle is traveling to a position which is substantially at right angles to the direction in which the vehicle is traveling.

6. In combination with a vehicle, a signal including a frame upon the top of the vehicle, a rotary cam member associated with said frame, a horizontal pole carried by said cam member, signal means upon said pole, said cam member having a curved cam slot, a reciprocating operating rod, a roller carried by said rod and engaging said cam slot for swinging said pole in a horizontal plane from a position which is substantially parallel to the direction in which the vehicle is traveling to a position which is substantially at right angles to the direction in which the vehicle is traveling, there being a recess at one end of the slot, and resilient means upon the cam member for urging the roller into said recess.

CARL B. DAGER.